United States Patent [19]
Harkness et al.

[11] Patent Number: 5,614,603
[45] Date of Patent: Mar. 25, 1997

[54] THERMOSETTING SILICONE RESINS

[75] Inventors: Brian R. Harkness, S. Glamorgan, United Kingdom; Mamoru Tachikawa; Kasumi Takeuchi, both of Kanagawa, Japan

[73] Assignee: Dow Corning Asia, Ltd., Tokyo, Japan

[21] Appl. No.: 593,318

[22] Filed: Jan. 31, 1996

[30] Foreign Application Priority Data

Feb. 2, 1995 [JP] Japan .................................. 7-016186

[51] Int. Cl.$^6$ .................................................. C08G 77/08
[52] U.S. Cl. ............................... 528/14; 528/15; 528/18; 528/21; 528/31; 528/39; 528/43
[58] Field of Search ............................. 528/31, 15, 39, 528/18, 14, 21, 43

[56] References Cited

U.S. PATENT DOCUMENTS

| | | | |
|---|---|---|---|
| 3,234,180 | 2/1966 | Wu | 260/46.5 |
| 3,372,178 | 3/1968 | Wu | 260/448.2 |
| 4,238,590 | 12/1980 | Scholze et al. | 528/5 |
| 4,243,692 | 1/1981 | Scholze et al. | 427/2 |
| 4,374,933 | 2/1993 | Scholze et al. | 521/64 |
| 4,774,310 | 9/1988 | Butler | 528/43 |
| 5,516,867 | 5/1996 | Zank | 528/31 |

OTHER PUBLICATIONS

Silicone Handbook, edited by K. Itoh, Nikkan Kogyo Shinbunsha, p. 468.
Chemistry and Technology of silicones, 2nd Edition, p. 409, Walter Noll, Academic Press, Inc. (London) Ltd., 1968.
Chemistry and Technology of Silicones, 2nd Edition, p. 90.
Organosilicon Compounds, p. 200, C. Eaborn, Butterworths Scientific Publications (London), 1960.
Chemistry and Technology of Silicones, pp. 205 & 397.
Andrianov, K., et al., Dokl. Ada K. Naak SSSR, 220(4–6) 1321 (1975).

*Primary Examiner*—Melvyn I. Marquis
*Attorney, Agent, or Firm*—Sharon K. Severance

[57] ABSTRACT

The introduction of a highly spin-coatable silicone resin that does not produce large amounts of volatiles during its cure, and that is a precursor to highly heat-resistant, optically transparent cured products that exhibit an excellent hardness. The silicone resin comprises a silicone polymer of the general formula:

$$(Ph_2SiO)_a(HSiO_{3/2})_b(R^1SiO_{3/2})_c$$

in which $R^1$ is hydrogen or $C_1$ to $C_8$ hydrocarbon group, possibly containing a heteroatom, Ph is a phenyl group and $6 \leq a+b+c \leq 1,000$, $0.6 > a/(a+b+c) \geq 0.4$, and $1.0 \geq b/(b+c) \geq 0.2$.

13 Claims, No Drawings

THERMOSETTING SILICONE RESINS

BACKGROUND OF THE INVENTION

This invention relates to thermosetting silicone resins that provide highly heat-resistant and optically transparent cured products with excellent hardness. This invention also relates to a method for curing these thermosetting silicone resins.

Silicone resins are polymers with a three-dimensional structure. They are obtained by the hydrolysis and condensation of organosilane compounds. A substantial amount of information exists on the preparation and properties of silicone resins, on methods for curing these resins and on the physical properties of their cured products (*Silicone Handbook*, edited by Kunio Itoh, Nikkan Kogyo Shinbunsha, page 468; *Chemistry and Technology of Silicones*, 2nd Edition, p. 409, Walter Noll, Academic Press, Inc. (London) Ltd., 1968).

Silicone resins generally include DT resins, polysilsesquioxanes, and in some cases, MQ resins. DT resins are prepared by the cohydrolysis of difunctional and trifunctional hydrolyzable silane compounds. Difunctional hydrolyzable silane compounds possess 2 hydrolyzable functional groups and produce the siloxane unit known as the D unit ($(-O)_2SiR_2$). Trifunctional hydrolyzable silane compounds possess 3 hydrolyzable functional groups and produce the siloxane unit known as the T unit ($(-O)_3SiR$). Polysilsesquioxanes are produced by the hydrolysis of only trifunctional hydrolyzable silane compounds. MQ resins are produced by the cohydrolysis of monofunctional hydrolyzable silane compounds and tetrafunctional silane compounds. Monofunctional hydrolyzable silane compounds possess 1 hydrolyzable functional group and produce the siloxane unit known as the M unit ($-OSiR_3$). Tetrafunctional hydrolyzable silane compounds such as silicon tetrachloride, in which all the functional groups are hydrolyzable, possess 4 hydrolyzable functional groups and produce the siloxane unit known as the Q unit ($Si(O-)_4$). In addition, many multicomponent resins, which can also be thought of as mixed systems of the preceding, are also known.

In cured form these silicone resins are used as heat-resistant coatings, protective coatings, electrical-insulating coatings, and so forth. These applications require that the uncured resin exhibit a good moldability and that the cured product exhibit heat resistance, hardness, etc.

Among the curing regimes available to silicone resins, the by-product-free curing reactions include (1) polymerization of silicone-bonded reactive organofunctional groups such as epoxy, methacryloxy, etc., and (2) hydrosilylation of an SiH and an Si-alkenyl (e.g., vinyl, allyl, etc). However, due to the low heat stability of the crosslink in each case, these methods are unsuitable for applications that require high heat resistance in the cured product.

When the particular application calls for high heat resistance, curing methods that produce a silox bond crosslink are often used. Many crosslinking reactions are known for this purpose. The following are frequently used:
1) Silanol group condensation

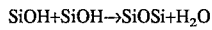

2) Alcohol elimination reaction between silanol and alkoxy groups

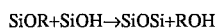

3) Oxime elimination reaction

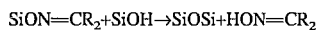

4) Amide elimination reaction

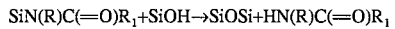

5) Acetic acid elimination reaction

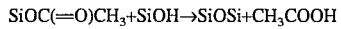

6) Acetone elimination reaction

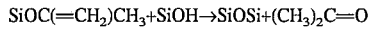

As is apparent, each of these reactions produce a by-product, e.g., water, alcohol, oxime, amide, acetic acid, and acetone. When organic compounds are eliminated during the cure, they can adversely affect the working and general environments.

When curing proceeds through formation of thermostable siloxane bonds by moisture-mediated curing reactions as commonly used for curing silicone resins (dehydration, alcohol elimination, oxime elimination, acetic acid elimination, acetone elimination, amide elimination, etc.), it is difficult to induce the formation of a thick, hard film. Moreover, a large weight loss occurs during cure. These factors cause substantial problems in terms of volume loss, warping, cracking, and so forth. Moreover, the fabrication of thick, hard monoliths is encumbered by the development of voids, cracks and dimensional instability in the cured material in association with vaporization of volatile by-products formed by the curing reaction.

It is also well known in silicon chemistry and the silicone industry that the hydroxyl group (e.g., of water, alcohol, silanol, etc.) will react with a hydrogen atom bonded directly to silicon to produce a hydrogen molecule and the silicon-oxygen bond, i.e., Si—O (refer to *Chemistry and Technology of Silicones*, 2nd Edition, p. 90; *Organosilicon Compounds*, p. 200, C. Eaborn, Butterworths Scientific Publications (London), 1960). Although the uncatalyzed reaction will run at elevated temperatures, it is widely known that this reaction will run more readily in the presence of a transition metal catalyst such as those of platinum, palladium, etc., a basic catalyst such as an alkali metal hydroxide, amine, etc., or a Lewis acid catalyst such as a tin compound, etc. Moreover, the use of crosslinking between Si—H and SiOH based on this reaction has been proposed as a room-temperature curing reaction for silicones (*Chemistry and Technology of Silicones*, p. 205, p. 397).

Resins containing large amounts of Q unit are used in applications where the hardness of the cured product is critical (e.g., in polysilsesquioxanes or DT resins). However, there is a tendency for the uncrosslinked resin to gel as the Q unit content increases. Moreover, the resin solubility, viscosity and processability also deteriorate. These problems can be addressed by using resins that contain the Q unit in the of a hydrolyzable group (such as an alkoxy group, etc.), but such resins suffer from large weight loss during cure.

Polysiloxanes containing diphenylsiloxane and hydrogensilsesquioxane as essential components have also been reported. For instance, Wu has reported cyclotrisiloxane and cyclotetrasiloxane composed of $SiH(OSiA_3)O$ and $SiA_2O$ (A=aryl) and, similarly, polymer composed of $SiH(OSiA_3)O$ and $SiA_2O$ (A=aryl) in U.S. Pat. Nos. 3,372,178 and 3,234,180. They are prepared by first synthesizing the 1,1,1-triaryl-2,2-dichlorodisiloxane by the reaction of triarylsilanol and trichlorosilane; then reacting this intermediate with diarylsilanediol to produce the cyclosiloxane; and subjecting this cyclosiloxane to ring-opening polymerization. In these siloxane compounds and polymers at least 1 triarylsiloxy group is bonded to the T unit ($HSiO_{3/2}$) originating from trichlorosilane, so the practical degree of crosslinking at this T unit is a maximum of 3 bonds. The crosslink density is reduced still further by the presence of large amounts of the triarylsiloxy group, which is a bulky end group. It is noted that Wu did make reference to curing the polymers through hydrosilylation using the hydrogen atom on the T unit of this siloxane. Again, however, crosslinking based on the hydrosilylation reaction produces Si—C bond crosslinks, which precludes the preparation of a highly thermostable cured material.

Scholze et al. have received patents on siloxane coatings, porous polysiloxanes, and adsorptive polysiloxane resins for which the essential components—expressed in terms of precursors—are hydrolyzable silicic acid derivatives and silane derivatives having 1 to 3 hydrocarbon groups. The hydrolyzable silicic acid derivatives in these patents include Si—H-containing compounds in addition to silicate esters such as alkyl orthosilicate, silicon tetrachloride, and the like (U.S. Pat. Nos. 4,374,933, 4,243,692, and 4,238,590). These resins contain the Q unit, which originates from the highly hydrolyzable-functional silicic acid derivatives. When the siloxane-forming condensation reactions used to obtain these resins are not carried to completion, the resins are soluble in organic solvents and are fluid in resin form. However, one would anticipate curing problems such as large weight losses and the evolution of large amounts of volatiles.

Andrianov et al. obtained the bicyclopentasiloxane $HSi(OSiPh_2O)_3SiH$ (Ph=phenyl) by the reaction of trichlorosilane and diphenylsilanediol. Although this reaction was also reported to provide a polymer, the identity of this polymer was not made clear. In terms of its component elements the bicyclopentasiloxane reported by Andrianov et al. contains both diphenylsiloxane and hydrogensilsesquioxane. However, a curing reaction of this bicyclopentasiloxane by itself was not described (Andrianov, K., et al., Dokl. Akad. Nauk SSSR, 220(4–6) 1321 (1975)).

The present invention takes as its object a solution to the problems described above for the prior art through the introduction of a highly spin-coatable thermosetting resin that provides an optically transparent and highly heat-resistant cured product having an excellent hardness.

In order to accomplish the aforesaid object of the invention, the inventors carried out intensive and extensive investigations into increasing the crosslink density of the cured product without impairing the solubility, solution viscosity, spin-coatability, etc., of the uncrosslinked resin; suppressing the weight loss and volume shrinkage that accompanies curing; and obtaining a highly thermostable cured product.

Specifically, the inventors have discovered that a silicone resin containing both the diphenylsiloxane unit and hydrogensilsesquioxane unit can satisfy the above requirements.

SUMMARY OF THE INVENTION

The present invention relates to a silicone resin. The resin comprises a silicone polymer having the general formula $(Ph_2SiO)_a(HSiO_{3/2})_b(R^1SiO_{3/2})_c$. In this formula, each $R^1$ independently represents $C_1$ to $C_{18}$ hydrocarbon groups which may contain at least 1 atom selected from the group consisting of oxygen, nitrogen, chlorine, fluorine, and silicon. The Ph in the formula represents a phenyl group. The other bond of the O in the formula may attach to silicon to form a siloxane bond or may attach to a hydrogen atom to form silanol. The average degree of polymerization of the polymer molecule (i.e., a+b+c) is 6 to 1,000. The average proportions of the monomer units fall within the following ranges:

$0.6 > a/(a+b+c) \geq 0.4$ $1.0 \geq b/(b+c) \geq 0.2$.

The present invention also relates to method for the preparation of the above silicone resin. The method comprises adding diphenylsilanediol to either (1) $HSiX_3$ or (2) the mixture of $HSiX_3$ and $R^1SiX_3$ and then hydrolyzing the silicone resin at temperatures not exceeding 100° C. In the above formulas, each X independently denotes a hydrolyzable group selected from the chlorine atom and bromine atom and $R^1$ is defined as above, The present invention also relates to a thermosetting polyorganosiloxane composition. The composition comprises (a) a silicone resin of the formula $(Ph_2SiO)_a(HSiO_{3/2})_b(R^1SiO_{3/2})_c$ and (b) at least 1 catalytic component selected from the group consisting of basic compounds, divalent and tetravalent tin compounds, palladium metal, platinum metal, palladium compounds, and platinum compounds. The catalytic component is present in the mixture at 0.01 to 10 weight % based on the silicone resin when it is a basic compound or a divalent or tetravalent tin compound. The catalytic component is present in the mixture at 0.00001 to 1 weight % based on the silicone resin when it is palladium metal, platinum metal, a palladium compound, or a platinum compound.

The present invention also relates to a method for curing the above silicone resin. The method comprises heating the silicone resin at 200° C. to 500° C. Alternatively, the method comprises heating the above silicone resin and catalyst composition at temperatures not exceeding 500° C.

DETAILED DESCRIPTION OF THE INVENTION

The present invention makes possible the fabrication of highly heat-resistant, transparent cured products that have excellent hardness. This is accomplished by the use of a very spin-coatable silicone polymer molecule that does not evolve large amounts of volatiles during its cure.

The essential starting components for this silicone polymer molecule are diphenylsilanediol and trihalosilane, and the resultant resin contains diphenylsiloxane ($Ph_2SiO_{2/2}$) and hydrogensilsesquioxane ($HSiO_{3/2}$) as its essential components. More specifically, the hydrogensilsesquioxane unit ($HSiO_{3/2}$) in the polymer molecule reacts with the hydroxyl group (OH)—thereby forming the silicon-oxygen bond (Si—O) and a hydrogen molecule ($H_2$)—and also forms the silicon-oxygen bond (Si—O) through its oxidation when heated in the presence of oxygen. Crosslinking and curing of the silicone polymer molecule therefore proceeds through the very thermostable siloxane bond, which means that this curable silicone polymer molecule can be used to fabricate cured silicone products that are highly heat resistant.

The first embodiment of the present invention is a silicone resin composed of silicone polymer with general formula:

$$(Ph_2SiO)_a(HSiO_{3/2})_b(R^1SiO_{3/2})_c \quad (1)$$

in which each $R^1$ independently represents $C_1$ to $C_{18}$ hydrocarbon groups, which may contain at least 1 atom selected from oxygen, nitrogen, chlorine, fluorine, and silicon. Ph represents the phenyl group. The other bond of the O, which is the divalent oxygen atom bonded to silicon in general formula (1), may at h to silicon to form a siloxane bond or may attach to a hydrogen atom to form silanol. The average degree of polymerization of the polymer molecule, i.e., a+b+c, is 6 to 1,000. The average proportions of monomer units in the polymer molecule fall within the following ranges:

$$0.6 > a/(a+b+c) \geq 0.4$$

$$1.0 \geq b/(b+c) \geq 0.2.$$

The molecular weight of the product declines when a in the composition of the polymer molecule deviates substantially from the range specified above. When b/(b+c) falls below the above-specified range, the Q unit content in the cured product will be reduced and the hardness of the cured product will decline.

The second embodiment of the present invention relates to a method for the preparation of the above silicone resin. specifically, the method comprises the hydrolysis—at temperatures not exceeding 100° C. —of the silicone resin obtained by the addition of diphenylsilanediol to the silane compound or compounds that generate the T component of subject silicone resin, i.e., to $HSiX_3$ or the mixture of $HSiX_3$ and $R^1SiX_3$ ($R^1$ is defined as above and each X independently represents a hydrolyzable group selected from chlorine and bromine).

An acid acceptor is preferably used in this reaction at fewer gram-equivalents than the total for X. The acid acceptor may be preliminarily added to the $HSiX_3$ or $HSiX_3/R^1SiX_3$ mixture or may be added together with the diphenylsilanediol to the $HSiX_3$ or $HSiX_3/R^1SiX_3$ mixture. Since the acid acceptor often a good solvent for diphenylsilanediol, a particularly preferred technique consists of dissolving the diphenylsilanediol in the acid acceptor and adding the mixture to the $HSiX_3$ or $HSiX_3/R^1SiX_3$ mixture. However, adding excess acid acceptor during hydrolysis must be avoided since it makes the system alkaline.

Acid acceptors suitable for the present purpose are exemplified by ammonia; alkylamines and aralkylamines such as methylamine, hexylamine, octylamine, aniline, benzylamine, dimethylamine, diethylamine, dihexylamine, ethylbenzylamine, trimethylamine, triethylamine, tripropylamine, and dimethylbenzylamine; and aromatic amines such as pyridine, picoline, and quinoline.

It is crucial that the diphenylsilanediol be added to the $HSiX_3$ or $HSiX_3/R^1SiX_3$ mixture. If the materials are added in reverse, gelation of the resin is facilitated in the initial stage of synthesis due to the development of the crosslinked structure of the resin. Moreover, the secondary production of T unit-rich resin during hydrolysis is also facilitated.

The diphenylsilanediol, $HSiX_3$ or $HSiX_3/R^1SiX_3$ mixture may be dissolved in organic solvent for use in this process.

In order to inhibit gelation of the resin by silanol condensation during hydrolysis of the resin afforded by the addition of diphenylsilanediol to the above-described $HSiX_3$ or $HSiX_3/R^1SiX_3$ mixture, techniques should be pursued such as dilution with solvent (e.g., ether, toluene, etc.), the rapid addition of large amounts of water, and the like; and the temperature of the product should not be allowed to exceed 100° C. Maintenance at temperatures not exceeding 50° C. is even more preferred.

The following is an example of a specific process for synthesizing the resin. The precursors for the $HSiO_{3/2}$ and $R^1SiO_{3/2}$, for example, $HSiCl_3$ and $R^1SiCl_3$, are placed in a reactor. Then, while stirring thoroughly, silicone resin bearing hydrolyzable chloride is first synthesized by the addition of diphenylsilanediol together with acid acceptor (added at fewer mole-equivalents than the total for the silicon-bonded chlorine on the chlorosilane in the reactor). While cooling the reactor to a temperature not exceeding 50° C., the synthesis proceeds by hydrolysis of the resin with a large amount of water and then thoroughly washing the organic component thereby produced with water.

The sequence of addition of the reagents, the reaction temperature, and the hydrolysis conditions are very important in terms of being able to run the reaction while inhibiting gelation reactions in said resin. The presence of the acid acceptor is not essential to the subject reaction, but its addition does accelerate the reaction.

When the reaction is run using the given sequence of addition, the rapid development of the dehydrochlorination reaction between trichlorosilane and the silanolic hydrogen of diphenylsilanediol produces an alternating structure which is the basic structure of the product as represented by general formula (1).

When carrying out the above-described synthetic reactions, a small amount of silane that provides the M component upon hydrolysis makes possible rational control of the molecular weight of the resin and also permits the introduction of reactive functional groups. Said M component-generating silane is exemplified by trimethylchlorosilane, vinyldimethylchlorosilane, dimethylchlorosilane, and triphenylchlorosilane.

Similarly, the use of a small amount of silane that provides the D component upon hydrolysis permits rational control of resin hardness and also permits the introduction of reactive functional groups. Said D component-generating silane is exemplified by dimethyldichlorosilane, methyldichlorosilane, vinylmethyldichlorosilane, and phenylmethyldichlorosilane.

Finally, the use of silane that provides the Q component upon hydrolysis, such as silicon tetrachloride, permits rational regulation of resin hardness.

However, when these M, D, and Q component-generating silanes are used in excess, and specifically when the sum of the M, D, and Q components is greater than or equal to 20% of (a+b+c), this has a negative effect on the stability against gelation or the hardness of the cured product, which is a characteristic feature of resin according to the present invention.

The third embodiment of the present invention relates to compositions comprising the above silicone polymer molecule (1) and a catalyst for its curing reaction. More specifically, these are compositions comprising the above silicone polymer molecule and at least 1 catalytic component selected from the group consisting of basic compounds, divalent and tetravalent tin compounds, palladium, platinum, palladium compounds, and platinum compounds.

In the case of basic compounds and divalent and tetravalent tin compounds, the quantity of addition for obtaining ideal curing properties and ideal physical properties in the cured product is 0.01 to 10 weight % and more preferably 0.1 to 5 weight %, in each case based on the silicone polymer molecule. In the case of palladium, platinum, palladium compounds, and platinum compounds, the suitable quantities are 0.00001 to 1 weight % and more preferably 0.00005 to 0.1 weight %, in each case based on the silicone polymer.

The basic compounds are exemplified by ammonia, primary organic amines, secondary organic amines, tertiary organic amines, ammonium halides, quaternary ammonium hydroxides, and quaternary phosphonium hydroxides. The tin compounds are exemplified by the carboxylate salts of divalent tin, the alkyl and aryl compounds of divalent tin, the alkoxy compounds of divalent tin, the alkyl and aryl compounds of tetravalent tin, dialkyltin(IV) dicarboxylates, dialkyltin(IV) bis(acetylacetonate)s, and the alkoxy compounds of tetravalent tin. The palladium catalysts are exemplified by palladium metal, as typified by palladium black, and by the olefin complexes of palladium(II) halides. The platinum catalysts are exemplified by platinum metal, as typified by platinum black, as well as by chloroplatinic acid, the olefin complexes of platinum(II) halides, the phosphine complexes of platinum(II) halides, the olefin complexes of zero-valent platinum, and so forth.

The above catalysts function as catalysts of the reaction of the hydroxyl group and SiH to produce a hydrogen molecule and the silicon-oxygen bond. As long as this reaction is not poisoned, other catalytic components such as titanium compounds may be added to composition.

The fourth embodiment of the present invention relates to a method for curing the above silicone resin and for curing the above polyorganosiloxane/curing catalyst compositions. The method comprises heating the silicone resin (without curing catalyst) at temperatures of 200° C. to 500° C. The polyorganosiloxane/curing catalyst compositions are heated at a temperature of at least 50° C. but not exceeding 500° C.

The time required for curing is not crucial, but in practical terms curing will be carried out for approximately several seconds to several tens of minutes at high temperatures (500° C.) and for 1 hour to several days at low temperatures. Under these conditions, curing proceeds through siloxane bond formation by dehydrogenative condensation between silanol and SiH and oxidation of SiH by atmospheric oxygen and/or hydrolysis by atmospheric moisture. Accordingly, when silanol is not present in the silicone polymer molecule, heating should be carried out in air or in the presence of oxygen or water. However, no specific restrictions need be formulated here as long as the usual concentrations of moisture and/or oxygen are present.

Upon heating under the aforesaid conditions, the silanol in the composition undergoes a dehydrogenative condensation reaction with the SiH in the same composition, and a siloxane bond is thereby formed with the loss of a hydrogen molecule. When silanol is present in excess relative to SiH, this dehydrogenative condensation reaction is accompanied by siloxane bond formation through a dehydration condensation between silanols with the loss of a water molecule. When SiH is present in excess relative to silanol, the residual SiH will react with atmospheric water or oxygen to form silanol, which will then undergo dehydrogenative condensation with another SiH to form a siloxane bond with the loss of a hydrogen molecule.

Thus, the reaction of SiH with silanol results in only a weight loss of 2 g (hydrogen molecule) per 1 mole of siloxane bonds formed. The reaction between SiH groups results in the uptake of an oxygen atom and loss of a hydrogen molecule, or a weight gain of 14 g (gain due to the oxygen atom and loss of the hydrogen molecule) per 1 mole of siloxane bonds formed. This is much smaller than the weight loss of 48 g/mol-siloxane bond for the methanol elimination reaction ($2SiOCH_3 + H_2O \rightarrow SiOSi + 2CH_3OH$) and the weight loss of 100 g/mol-siloxane bond for the acetone elimination reaction ($2SiOC(=CH_2)CH_3 + H_2O \rightarrow SiOSi + 2(CH_3)_2CO$).

EXAMPLES

The present invention is explained in greater detail through the working and reference examples provided below, but the present invention is not limited by these examples. $^1$H-NMR and $^{29}$Si{1H}-NMR denote, respectively, proton nuclear magnetic resonance spectra and silicon-29 nuclear magnetic resonance spectra (proton decoupled) in the product property descriptions in the examples below. Quantitative $^{29}$Si-NMR measurements were run with the addition of tris(acetylacetonate)chromium(III) to a deuterochloroform (CDCl$_3$) solution of the sample. The details are reported in *The Analytical Chemistry of Silicones*, edited by A. Lee Smith, John Wiley & Sons, Inc. (1991), page 377. As described therein, the a:b:c ratio can be determined as the relative intensity for each functional group in the $^{29}$Si-NMR. The chemical shifts in the $^1$H-NMR spectra were in all cases assigned by using 7.24 ppm for the resonance position of the residual CHCl$_3$ in the CDCl$_3$ solvent. The chemical shifts in the $^{29}$Si-NMR spectra were assigned by using 0 ppm for the chemical shift of silicon in a tetramethylsilane external standard (CDCl$_3$ solution). TG refers to thermal gravimetric analysis. In the examples and comparative examples, the weight change during TG was measured in air at a temperature rise of 10° C./minute, and the temperature at which the weight of the sample had declined by 10% during this measurement is reported as Td10. GPC refers to gel permeation chromatography. In the examples and comparative examples, toluene was used as the solvent in GPC, and the molecular weight is the value based on polystyrene. Below, Mn refers to the number-average molecular weight, Mw refers to the weight-average molecular weight, Ph is an abbreviation for phenyl, and Me is an abbreviation for methyl.

The molecular weight determined by GPC for silicones containing the diphenylsiloxane unit and the like tends to be somewhat smaller than the actual molecular weight. When such silicones contain the silanol group, the molecular weight afforded by GPC tends to be only slightly different from the actual molecular weight.

Example 1

Synthesis of diphenylsiloxane-hydrogensilsesquioxane resin 100 mL ether and 16.8 mL trichlorosilane were introduced into a nitrogen-filled 300-mL three-neck flask, which was then cooled to −78° C. 30 g diphenylsilanediol dissolved in 22.5 mL pyridine was added over a period of 10 minutes while stirring well. The temperature was raised to room temperature while stirring and the reaction was subsequently stirred for an additional 1 hour. Once the solution had been cooled back to 0° C., 50 mL water was added while stirring vigorously. After stirring for an additional 30 minutes, 200 mL ether was added and the organic layer was washed several times with water. The addition of hexane followed by filtration and then elimination of the solvent at room temperature gave 27 g of a transparent resin. This resin was dissolved in toluene (20 weight % solution) and heated under reflux for 30 minutes to afford the solution used for subsequent reaction.

Molecular weights by GPC (polystyrene basis) Mn=1900, Mw=9600

Infrared absorption: 2239 cm$^{-1}$ (Si—H), 3200–3700 cm$^{-1}$ (SiOH)

$^{29}$Si-NMR (CDCl$_3$), delta (functional group, relative intensity): −38 to −47 ppm (Ph$_2$SiO, 10), −73 to −79 ppm (HSiO(OH), 2.0), −80 to −83 ppm (HSiO$_{3/2}$, 10.3)

Example 2

Synthesis of diphenylsiloxane-methylsilsesquioxane-hydrogensilsesquioxaneresin

This synthesis was run by the same procedure as in Example 1, but in this case using 9.8 mL methyltrichlorosilane and 8.4 mL trichlorosilane in place of the 16.8 mL trichlorosilane. 32 g of a transparent resin was obtained.

Molecular weights by GPC (polystyrene basis) Mn=3720, Mw=110,000

Infrared absorption: 2230 cm$^{-1}$ (Si—H), 1128 cm$^{-1}$ (Si—Ph), 1092 cm$^{-1}$ (Si—Me)

$^{29}$Si-NMR (CDCl$_3$), delta (functional group, relative intensity): −32 to −48 ppm (Ph$_2$SiO, 10), −53 to −57 ppm (MeSiO(OH), 2.8), −62 to −67 (MeSiO$_{3/2}$, 2.9), −71 to −86 ppm (HSiO$_{3/2}$, 5.4)

Example 3

Synthesis of diphenylsiloxane-phenylsilsesquioxane-hydrogensilsesquioxane resin

This synthesis was run as in Example 1, but in this case using 20 g diphenylsilanediol, 8.84 mL phenyltrichlorosilane and 5.61 mL trichlorosilane, and 66 mL ether as solvent. Isolation and purification yielded 25 g of a transparent and very viscous resin.

Molecular weights by GPC (polystyrene basis) Mn=1870, Mw=3070

Infrared absorption: 3200–3600 cm$^{-1}$ (SiOH), 2234 cm$^{-1}$ (Si—H), 1130 cm$^{-1}$ (Si—Ph), 1094 cm$^{-1}$ (Si—O)

$^{29}$Si-NMR (CDCl$_3$), delta (functional group, relative intensity): −33 to −46 ppm (Ph$_2$SiO, 10), −66 to −85 ppm (HSiO$_{3/2}$ and PhSiO$_{3/2}$, 12.4 )

Example 4

Thermosetting of the diphenylsiloxane-hydrogensilsesquioxane resin

Zero-valent platinum/vinylsiloxane complex sufficient to give 100 ppm platinum based on resin was added to the 20 weight % toluene solution of diphenylsiloxane-hydrogensilsequioxane resin prepared in Example 1. This was spin-coated (1,000 rpm, 5 seconds) on a silicon wafer and dried at ambient temperature. The silicon wafer was then heated in the air for 1 hour at 400° C. to give a cured resin film. The infrared absorption spectrum of the cured film indicated complete disappearance of the Si—H group. The pencil hardness of this cured film was 3H.

Example 5

Curing of the diphenylsiloxane-methylsilsesquioxane-hydrogensilsesquioxane resin A 20 weight % toluene solution of the diphenylsiloxane-methylsilsesquioxane-hydrogensilsesquioxane resin synthesized in Example 2 was prepared. To this solution was added cyclohexylamine at 5 weight % referred to the resin. The solution was then spin-coated (1,000 rpm, 5 seconds) on a silicon wafer and dried at ambient temperature. The silicon wafer was thereafter heated in the air for 1 hour at 250° C. to give a cured resin film. The infrared absorption spectrum of the cured film indicated complete disappearance of the Si—H group. The pencil hardness of this cured film was 2H.

In addition, a column-like sample (4 mm×5 mm×15 mm) was fabricated by first heating the diphenylsiloxane-methylsilsesquioxane-hydrogensilsesquioxane resin from Example 2 in a vacuum for 1 hour at 50° C. in order to eliminate the volatiles and then heating—without the addition of catalyst—for 3 hours at 400° C. The linear coefficient of thermal expansion measured on this sample was 120 ppm/°C.

Example 6

Curing of the diphenylsiloxane-methylsilsesquioxane-hydrogensilsesquioxane resin A 20 weight % toluene solution of the diphenylsiloxane-methylsilsesquioxane-hydrogensilsesquioxane resin synthesized in Example 2 was prepared. To this solution was added tin(II) octanoate at 1 weight % based on the resin. The solution was then spin-coated (1,000 rpm, 5 seconds) on a silicon wafer and dried at ambient temperature. The silicon wafer was thereafter heated in the air for 1 hour at 250° C. to give a cured resin film. The infrared absorption spectrum of the cured film indicated complete disappearance of the Si—H group. The pencil hardness of this cured film was 2H.

A colorless, transparent cured resin was also obtained by casting the aforementioned solution and then thermosetting (250° C., 1 hour). This cured resin sample had a Td10 in air of 501° C.

Example 7

Curing of the diphenylsiloxane-methylsilsesquioxane-hydrogensilsesquioxane resin A 20 weight % toluene solution of the diphenylsiloxane-methylsilsesquioxane-hydrogensilsesquioxane resin synthesized in Example 2 was prepared. To this solution was added sufficient zero-valent platinum/vinylsiloxane complex to give 1,000 ppm platinum based on the resin. The solution was then spin-coated (1,000 rpm, 5 seconds) on a silicon wafer and dried at ambient temperature. The silicon wafer was thereafter heated in the air for 1 hour at 250° C. to give a cured resin film. The infrared absorption spectrum of the cured film indicated complete disappearance of the Si—H group. The pencil hardness of this cured film was 3H.

Example 8

Curing of the diphenylsiloxane-phenylsilsesquioxane-hydrogensilsesquioxane resin A 20 weight % toluene solution of the diphenylsiloxane-phenylsilsesquioxane-hydrogensilsesquioxane resin synthesized in Example 3 was prepared. To this solution was added sufficient zero-valent platinum/vinylsiloxane complex to give 100 ppm platinum based on the resin. The solution was then spin-coated (1,000 rpm, 5 seconds) on a silicon wafer and dried at ambient temperature. The silicon wafer was thereafter heated in the air for 1 hour at 400° C. to give a cured resin film. The infrared absorption spectrum of the cured film indicated complete disappearance of the Si—H group. The pencil hardness of this cured film was 2H.

Example 9

Thermosetting of the diphenylsiloxane-hydrogensilsesquioxane resin

The 20 weight % toluene solution of diphenylsiloxane-hydrogensilsesquioxane resin prepared in Example 1 (without catalyst addition) was spin-coated (1,000 rpm, 5 seconds) on a silicon wafer. After drying at ambient temperature, the silicon wafer was heated at 480° C. in air for 20 minutes to give a cured resin film. The infrared absorption spectrum of the cured film indicated complete disappearance of the Si—H group. The pencil hardness of this cured film was 3H.

Comparative Example 1

Preparation and curing of diphenylsiloxane-methylsilsesquioxane resin 42.7 g methyltrichlorosilane was introduced into a nitrogen-filled 500-mL three-neck flask and cooled to 0° C. 46.4 g diphenylsilanediol dissolved in 37.4 g pyridine was then added over a period of 10 minutes while stirring well. The temperature was then raised to room temperature while stirring and the reaction was thereafter stirred for an additional 1 hour. 93 mL toluene was subsequently added, followed by the addition of 200 mL water with vigorous stirring and then stirring for an additional 30 minutes. 200 mL ether was added and the organic layer was washed several times with water. The addition of hexane, filtration, and solvent elimination at room temperature yielded 54.7 g resin. This resin was dissolved toluene (20 weight % solution) and heated under reflux for 30 minutes to afford a solution that was used for the subsequent reaction.

Infrared absorption: 3000–3600 cm$^{-1}$ (SiOH), 1127 cm$^{-1}$ (Si—Ph), 1030 cm$^{-1}$, 1090 cm$^{-1}$ (Si—O)

$^{29}$Si-NMR (CDCl$_3$): −35 to −47 ppm (Ph$_2$SiO), −50 to −60 ppm (MeSiO(OH)), −60 to −70 ppm (MeSiO$_{3/2}$)

1 weight % (based on resin) tin(II) octanoate was then added to this 20 weight % toluene solution of the diphenylsiloxane-methylsilsesquioxane resin, and the resulting solution was spin-coated (1,000 rpm, 5 seconds) on a silicon wafer. After drying at ambient temperature, the silicon wafer was heated in air at 250° C. for 1 hour to produce a cured resin film. This cured film had a pencil hardness of H.

That which is claimed is:

1. A silicone resin comprising a silicone polymer having the general formula (Ph$_2$SiO)$_a$(HSiO$_{3/2}$)$_b$(R$^1$SiO$_{3/2}$)$_c$ wherein each R$^1$ independently represents C$_1$ to C$_{18}$ hydrocarbon groups which may contain at least 1 atom selected from the group consisting of oxygen, nitrogen, chlorine, fluorine, and silicon; Ph represents the phenyl group; the other bond of the O may attach to silicon to form a siloxane bond or may attach to a hydrogen atom to form silanol; the average degree of polymerization of the polymer molecule is 6 to 1,000; and the average proportions of the monomer units fall within the range of 0.6>a/(a+b+c)≧0.4 and 1.0≧b/(b+c)≧0.2.

2. A method for preparing the silicone resin of claim 1 comprising:

adding diphenylsilanediol to a material selected from the group consisting of HSiX$_3$ and a mixture of HSiX$_3$ and R$^1$SiX$_3$ to form a hydrolysis mixture, wherein each X independently denotes a hydrolyzable group selected from the group consisting of the chlorine atom and bromine atom and R$^1$ independently represents C$_1$ to C$_{18}$ hydrocarbon groups which may contain at least 1 atom selected from the group consisting of oxygen, nitrogen, chlorine, fluorine, and silicon; and hydrolyzing the hydrolysis mixture at temperatures not exceeding 100° C.

3. The method of claim 2, wherein the diphenylsilanediol is added in the presence of an acid acceptor, with the proviso that the amount of acid acceptor is limited to fewer mole-equivalents than the total amount of chlorine and bromine bonded to silicon in the hydrolysis mixture.

4. The method of claim 2 wherein X is chlorine and R$^1$ is selected from the group consisting of methyl and phenyl.

5. The method of claim 3 wherein the acid acceptor is selected from the group consisting of ammonia, alkylamines, aralkylamines, and aromatic amines.

6. The method of claim 2 wherein the reactants are dissolved in an organic solvent prior to reaction.

7. The method of claim 2 wherein the reaction temperature does not exceed 50° C.

8. The method of claim 2 wherein up to 20 wt. % of at least one silane that provides a component selected from the group consisting of (—O)$_2$SiR$^1{}_2$), —OSiR$^1{}_3$, and Si(O—)$_4$ is included in the reaction mixture, wherein R$^1$ independently represents C$_1$ to C$_{18}$ hydrocarbon groups which may contain at least 1 atom selected from the group consisting of oxygen, nitrogen, chlorine, fluorine, and silicon.

9. A thermosetting polyorganosiloxane composition comprising (a) silicone resin according to claim 1 and (b) at least 1 catalytic component selected from the group consisting of basic compounds, divalent and tetravalent tin compounds, palladium metal, platinum metal, palladium compounds, and platinum compounds.

10. The composition of claim 9 wherein the catalytic component is selected from the group consisting of basic compounds, divalent tin compounds and tetravalent tin compounds and said component is present at 0.01 to 10 weight % based on the amount of silicone resin.

11. The composition of claim 9 wherein the catalytic component is selected from the group consisting of palladium metal, platinum metal, a palladium compound, and a platinum compound and said component is present at 0.00001 to 1 weight % based on the amount of silicone resin.

12. A method for curing the silicone resin of claim 1 comprising:

heating the silicone resin of claim 1 at 200° C. to 500° C.

13. A method for curing the thermosetting polyorganosiloxane composition of claim 4 comprising:

heating the thermosetting polyorganosiloxane composition of claim 4 at temperatures not exceeding 500° C.

* * * * *